US012440416B2

(12) United States Patent
Humayun et al.

(10) Patent No.: US 12,440,416 B2
(45) Date of Patent: Oct. 14, 2025

(54) DOUBLE-BLINDED, RANDOMIZED TRIAL OF AUGMENTED REALITY LOW-VISION MOBILITY AND GRASP AID

(71) Applicant: UNIVERSITY OF SOUTHERN CALIFORNIA, Los Angeles, CA (US)

(72) Inventors: Mark S. Humayun, Los Angeles, CA (US); Anastasios Angelopoulos, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 375 days.

(21) Appl. No.: 17/298,589

(22) PCT Filed: Dec. 2, 2019

(86) PCT No.: PCT/US2019/063924
§ 371 (c)(1),
(2) Date: May 30, 2021

(87) PCT Pub. No.: WO2020/113202
PCT Pub. Date: Jun. 4, 2020

(65) Prior Publication Data
US 2022/0015982 A1    Jan. 20, 2022

Related U.S. Application Data

(60) Provisional application No. 62/773,979, filed on Nov. 30, 2018.

(51) Int. Cl.
*A61H 3/06* (2006.01)
*G02B 27/01* (2006.01)
(Continued)

(52) U.S. Cl.
CPC ......... *A61H 3/061* (2013.01); *G02B 27/0101* (2013.01); *G02B 27/017* (2013.01);
(Continued)

(58) Field of Classification Search
CPC .. A61H 3/061; G06T 7/50; G06T 7/90; G06T 19/006; G02B 27/0101; G02B 27/017
See application file for complete search history.

(56) References Cited

U.S. PATENT DOCUMENTS 10,908,680 B1 *   2/2021   Woods .................. G06T 19/006
2001/0027272 A1 * 10/2001   Saito .................... A61B 1/0005
                                                           600/429
(Continued)

FOREIGN PATENT DOCUMENTS

KR    1020170111282 A    10/2017
KR       20180068539 A     6/2018

OTHER PUBLICATIONS

International Search Report dated Mar. 20, 2020 for PCT Appn. No. PCT/US2019/063924, 15 pgs.

*Primary Examiner* — Jeremiah C Hallenbeck-Huber
(74) *Attorney, Agent, or Firm* — Brooks Kushman P.C.

(57) ABSTRACT

An augmented reality system for providing depth perspective includes a sensor system that provides spatial data of objects in a surrounding environment of a user. A computer processor system calculates spatial information of the objects from the spatial data received the sensor system. The computer processor system determines a depth-to-color mapping in which distance of objects from the user is mapped to a predetermined viewable representation. The system also includes a head mountable display that displays the depth-to-color mapping to the user. Characteristically, distances of the objects from the user are rendered to allow at least partial viewability of the object by the user. A method utilizing the augmented reality system is also provided.

22 Claims, 11 Drawing Sheets

(51) Int. Cl.
*G06T 7/50* (2017.01)
*G06T 7/90* (2017.01)
*G06T 19/00* (2011.01)

(52) U.S. Cl.
CPC ............... G06T 7/50 (2017.01); G06T 7/90 (2017.01); G06T 19/006 (2013.01); *A61H 2201/165* (2013.01); *G02B 2027/0127* (2013.01); *G02B 2027/0138* (2013.01); *G06T 2210/41* (2013.01); *G06T 2219/2012* (2013.01)

(56) References Cited

U.S. PATENT DOCUMENTS

| | | | |
|---|---|---|---|
| 2003/0210228 A1* | 11/2003 | Ebersole | G06F 3/012 345/157 |
| 2007/0046695 A1* | 3/2007 | Bamberg | G06F 30/17 345/619 |
| 2008/0246759 A1* | 10/2008 | Summers | G06F 3/0304 348/E7.083 |
| 2009/0036775 A1* | 2/2009 | Ikuma | A61B 8/5238 600/443 |
| 2010/0080448 A1 | 4/2010 | Tam et al. | |
| 2011/0298827 A1* | 12/2011 | Perez | G06V 40/28 345/647 |
| 2012/0195460 A1 | 8/2012 | Lawrence Ashok Inigo | |
| 2012/0242678 A1 | 9/2012 | Border et al. | |
| 2013/0328895 A1* | 12/2013 | Sellers | G06T 1/20 345/522 |
| 2016/0042567 A1* | 2/2016 | Shuster | G06T 19/006 345/633 |
| 2017/0085855 A1* | 3/2017 | Roberts | G06T 3/0068 |
| 2017/0124760 A1* | 5/2017 | Murakawa | G06T 17/20 |
| 2017/0148102 A1* | 5/2017 | Franke | G06Q 30/0601 |
| 2017/0178375 A1* | 6/2017 | Benishti | G06F 3/017 |
| 2018/0168781 A1* | 6/2018 | Kopelman | A61B 90/36 |
| 2018/0259486 A1* | 9/2018 | Babcock, IV | G02B 27/0172 |
| 2019/0036990 A1* | 1/2019 | Souchard | H04M 1/72412 |
| 2019/0311542 A1* | 10/2019 | Douglas | A61B 6/547 |
| 2020/0027280 A1* | 1/2020 | Esselstrom | G06T 15/005 |
| 2020/0031281 A1* | 1/2020 | Watanabe | G06T 17/05 |
| 2020/0085511 A1* | 3/2020 | Oezbek | A61B 34/10 |

* cited by examiner

Mobility Maze Configuration 1

| Icon | Meaning |
|---|---|
| 🚶 | Starting position (not to scale) |
| 💧 | Light calibration point |

1 foot

Grasp Experiment Configuration

Depth Encoding Picture (from PoV of User)

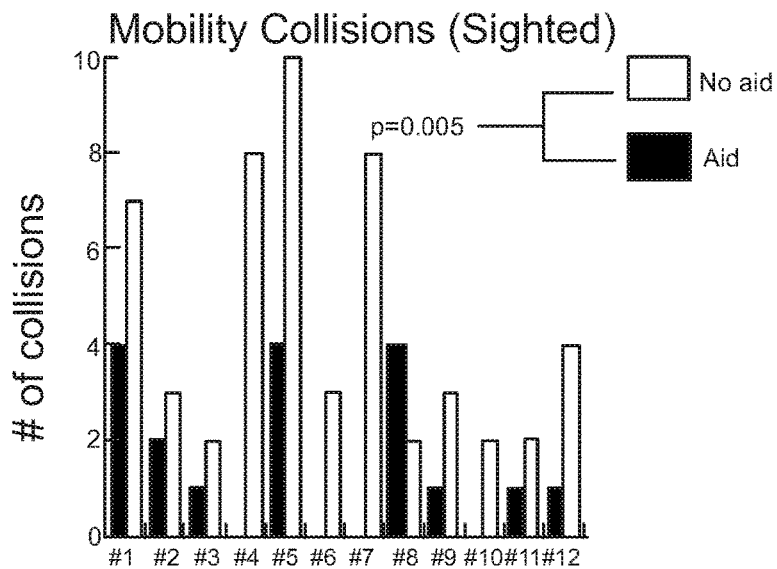
Fig. 5A
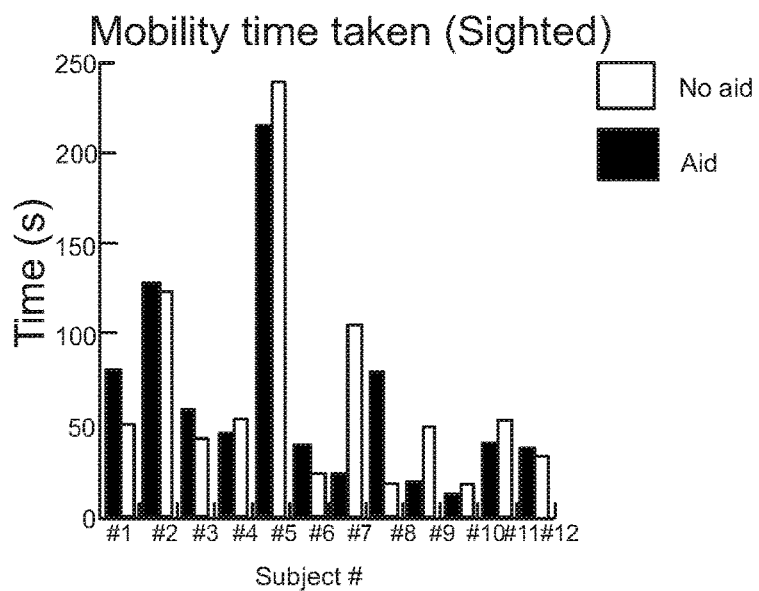
Fig. 5B
Table of Grasp Statistics (Sighted)
| Task | Δμ, errors (%) | p-value, errors | Δμ, time (%) | p-value, time |
|---|---|---|---|---|
| One-Handed Grasp | 85 | 0.03 | -15 | 1 |
| Two-Handed Grasp | 68 | 0.03 | -41 | 0.34 |
| Dynamic Grasp | 20 | 0.58 | 0 | 0.91 |
Fig. 5C One-Handed Grasp Experiment Two-Handed Grasp Experiment Dynamic Grasp Experiment Preliminary Mobility Course 1

Preliminary Mobility Course 2

DOUBLE-BLINDED, RANDOMIZED TRIAL OF AUGMENTED REALITY LOW-VISION MOBILITY AND GRASP AID

CROSS-REFERENCE TO RELATED APPLICATIONS

This application is the U.S. national phase of PCT Appln. No. PCT/US2019/063924 filed Dec. 2, 2019, which claims the benefit of U.S. provisional application Ser. No. 62/773,979 filed Nov. 30, 2018, the disclosures of which are hereby incorporated in their entirety by reference herein.

TECHNICAL FIELD

In at least one aspect, the present invention related to augmented reality devices that provide spatial information and analysis.

BACKGROUND

One to three million people worldwide have Retinitis Pigmentosa (RP) [1, 2, 3]. RP is an inherited retinal disease, in which cone and rod photoreceptors are progressively lost, often leading to blindness. Typically, patients with RP experience dark adaptation issues and night blindness in adolescence, lose peripheral vision in young adulthood and lose central vision later in life [4, 5]. RP patients, due to the low field of view during advanced stages of the disease, need assistive devices (e.g. canes) to complete basic tasks such as mobility. Also, patients with pigmentary retinopathy, which "mimics" RP, and syndromes such as Usher's Syndrome, in which RP is a symptom, suffer from the same challenges [6,7].

RP patients, especially in advanced stages, struggle with mobility and collide with obstacles at five times the normal frequency in low light [9,10, 11]. They also have poor dark adaptation and object grasping capabilities [12, 13]. This hinders the daily lives of visually impaired people as they struggle to perform basic tasks, like seeing in changing light conditions, navigating in unfamiliar places, walking outdoors, and engaging in leisure activities [14]. Unsurprisingly, visual field (VF) loss has a strong inverse correlation with vision-related quality of life using standard metrics like the National Eye Institute Visual Function Questionnaire-25 [15]. Many people with RP experience anxiety and "devastation" at the thought of losing their independence and freedom of movement [16].

Wearable electronic low-vision aids purport to improve mobility and basic task performance by helping RP patients determine the location and distance of objects from their body. Dozens of such aids aim to supplement the low bandwidth of an impaired eye with sensory stimuli [17,18, 19,20,21,22,23,24,25,26,27,28,29]. Although useful to some extent, aids that use virtual reality (VR) [18,19,20], auditory feedback [18,21,22,23], and haptic cues [24,25,26] often require significant training and slow down the mobility of patients, despite improving hazard avoidance in some cases [27]. However, over time, mobility speed may also improve: Hicks et al., for example, is one of the few examples of a VR visual aid accompanied by a sizeable user study (n=18); this study indicates simplified depth-based navigational aids in VR are easy to use for patients and improve collisions and time to completion over the course of 10 tests [28]. Each of the above devices has its own set of challenges: auditory and haptic cues require retraining the brain to understand complex mappings between audio/haptics and 3D space [30], and VR occludes patients' natural vision in favor of rendering algorithms which often magnify a scene leading to a restricted field of view and also interfere with people's natural social interactions by covering their eyes [31]. Furthermore, low battery life, the need to be tethered to a laptop, and discomfort deter potential users. Consequently, such devices have not been widely adopted by people with low vision.

Researchers have recognized these issues and proposed modifications using AR which enhance the natural senses rather than supplanting them [17]. One promising solution uses auditory Augmented Reality (AR) to sonify important 3D objects with natural language to improve navigation and object localization [32,33,34]. Another overlays 10 high-contrast bands of color on top of vision to improve edge detection but has yet to be evaluated for real-world mobility improvement in visually impaired patients [35]. As commercial AR headsets improve, visual aids using multiple electronic sensor inputs and object identification [18, 36] algorithms will merit further study. Younis et al., for example, developed a promising AR system that performs object detection, tracking, and classification to create a visual AR "warning system" for patients with low visual fields [29,37]. However, it was never tested on people, and because it relies on object categorization outside the visual field, it would require real-time eye-tracking on a large field of view to be effective. Still, for people with some remaining vision who struggle with mobility and object localization, a sophisticated visual AR overlay which helps interpret the full environment (rather than only the objects classified as hazards) may support their remaining visual system sufficiently to improve functionality on basic tasks such as navigation and grasp. Furthermore, any such aid must be evaluated carefully with metrics that correspond to real-world mobility and grasp outcomes.

Accordingly, there is a need for improved AR systems to improve mobility of users having vision impairments such as RP.

SUMMARY

In at least one aspect, an augmented reality system for providing depth perspective to a user is provided. The augmented reality system includes a sensor system that provides spatial data of objects in a surrounding environment of a user. A computer processor system calculates spatial information of the objects from the spatial data received from the sensor system. The computer processor system determines a depth-to-color mapping in which distance of objects from the user is mapped to a predetermined viewable representation. The system also includes a head-mountable display that displays the depth-to-color mapping to the user. Characteristically, distances of the objects from the user are rendered to allow at least partial viewability of the object by the user. A method utilizing the augmented reality system is also provided.

In another aspect, a method utilizing the augmented reality system for providing depth perspective to a user is provided. The method includes a step of receiving spatial data for objects in a surrounding environment of the user. Spatial information of the objects is calculated from spatial data, the spatial information including a depth-to-color mapping in which distance of objects from the user is mapped to a predetermined viewable representation. Finally, the depth-to-color mapping is displayed to the user on a head-mountable display wherein distances of the objects from the user are rendered to allow at least partial viewability of the objects by the user.

In another aspect, a novel AR pseudocolor encoding system for enhanced depth navigation is provided. The AR pseudocolor encoding system applies a 4-color depth encoded wireframe that can be used with commercially available AR devices. Advantageously, the AR pseudocolor encoding system is the first to show a statistically significant mobility improvement when RP patients use a visual AR low vision aid in a test validated by the FDA to correspond with a real-world mobility improvement, and also the first to do the same in a grasp experiment.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein:

FIGS. 5A, 5B, and 5C. Results from preliminary experiments on sighted subjects wearing RP simulation glasses. (A) In the mobility experiment, sighted subjects collided with fewer obstacles when using AR (66%, p=0.005). The horizontal axis indicates a particular subject, and the vertical axis indicates number of collisions. White bars indicate unaided performance and black bars indicate aided performance. Subjects 4, 6, 7, and 10 had no errors when tested with the aid on. (B) The vertical axis here means time to completion of the obstacle course. The horizontal axis is a grouping by subject and the bar colors indicate aided vs unaided performance. (C) The table shows group statistics for each of three preliminary grasp experiments completed on simulated RP subjects.

FIGS. 6A, 63, 6C, 6D, and 6E. Preliminary Experimental Setup. (A): Subjects were asked to grab the closest cylinder. (B): Subjects were asked to grasp the bag with both hands at the same time. (C): Subjects were asked to mime pouring tea into the mug. (D,E): One of the two randomly administered mobility courses for the preliminary sighted subject data. The open circle is starting point, filled circle is endpoint. Both mazes 1 and 2 are the same length and utilize the same obstacles. Subjects were asked to sit in the chair at the end of the course.

DETAILED DESCRIPTION

Figure 1:
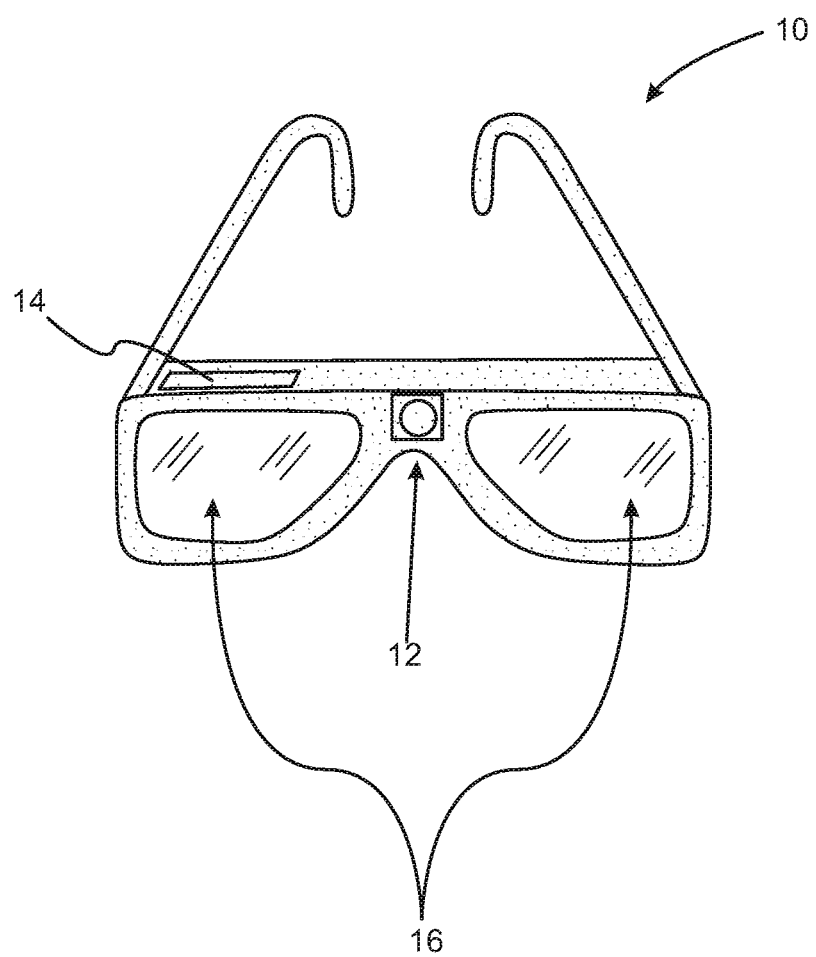
FIG. 1. Schematic of a wearable augmented reality device.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

For any device described herein, linear dimensions and angles can be constructed with plus or minus 50 percent of the values indicated rounded to or truncated to two significant figures of the value provided in the examples. In a refinement, linear dimensions and angles can be constructed with plus or minus 30 percent of the values indicated rounded to or truncated to two significant figures of the value provided in the examples. In another refinement, linear dimensions and angles can be constructed with plus or minus 10 percent of the values indicated rounded to or truncated to two significant figures of the value provided in the examples.

Throughout this application, where publications are referenced, the disclosures of these publications in their entireties are hereby incorporated by reference into this application to more fully describe the state of the art to which this invention pertains.

When a computing device or computer processing system is described as performing an action or method step, it is understood that the computing devices is operable to perform the action or method step typically by executing one or more line of source code. The actions or method steps can be encoded onto non-transitory memory (e.g., hard drives, optical drive, flash drives, and the like).

The term "computing device" or "computer processing system" refers generally to any device that can perform at least one function, including communicating with another computing device.

Abbreviations

"AR" means augmented reality.
"CME" means cystoid macular edema.
"ERG" means electroretinographic.
"MMRT" means Microsoft Mixed Reality Toolkit.
"PWS" means preferred walking speed.
"RP" means retinitis pigmentosa.
"SLAM" means simultaneous location and mapping.
"VA" means visual acuity.
"VF" means visual field.
"VR" means virtual reality.

With reference to FIG. 1, an augmented reality system for providing depth perspective to a user is provided. Augmented reality system 10 includes a sensor system 12 that provides spatial data of objects in a surrounding environment of a user. Augmented reality system 10 also includes a computer processor system 14 that calculates spatial information of the objects from the spatial data received the sensor system. The computer processor system determines (i.e., calculates) a depth-to-color mapping in which distance of objects from the user is mapped to a predetermined viewable representation. In variation, the predetermined viewable representation is selected from the group consisting of pseudocolor map, a frequency map in which there are different frequencies for different distances (e.g., faster blinking for closer objects), a brightness map in which there are different brightness for different distances, size map in which closer objects are bigger, and combinations thereof. In a refinement, the predetermined color is a pseudocolor or false-color with a plurality of discrete color changes based on distance from the user. It should be understood that the present embodiment is not limited by the number of discrete color changes. However, 3 to 10 (i.e., 3, 4, 5, 6, 7, 8, 9, or 10) color changes are found to be useful Still referring to FIG. 1, head-mountable display 16 displays the depth-to-color mapping to the user. Characteristically, distances of the objects from the user are rendered to allow at least partial viewability of the object by the user. In a refinement, the depth-to-color mapping in which the distance of the objects from a user is mapped to a colored wireframe with edge-enhancement as set forth below in more detail. In a refinement, the depth-to-color mapping also assists in identifying objects.

Typically, the sensor system and the head-mountable display are integrated into a single device. In a refinement, the sensor system, the computer processor system, and the head-mountable display are integrated into a single device. In still another variation, the sensor system and the head-mountable display are integrated into a first device and the computer processor system being a separate device in communication with the first device.

As set forth above, augmented reality system 10 includes a sensor system that provides spatial information (i.e., positional, geometric, etc.) in the vicinity of the user. In one refinement, sensor system 12 includes at least one sensor. In another refinement, sensor system 12 includes a plurality of sensors. Examples of suitable sensors that sensor system 12 can include are electromagnetic (e.g., infrared) sensor, optical sensors, video sensors, or combinations thereof. In a particularly useful variation, spatial data from the plurality of sensors is analyzed by sensor fusion to provide the spatial information.

In a variation, sensor system 12 includes a depth camera. In a refinement, sensor system 12 further includes at least one (e.g., 1, 2, 3, 4, 5, or 6) greyscale environment sensing camera that work with the depth camera to track the surrounding environment. In a further refinement, sensor system 12 includes a video camera and a light sensor.

As set forth above, augmented reality system 10 includes computer processor system 14 for calculating the depth-to-color mapping and rendering on wearable display 16. Typically, includes a CPU, GPU, and optionally a custom chipset, application specific integrated chip, HPU, or other integrated chip.

In another embodiment, a method for providing a depth perspective to a user is provided. The method includes a step of receiving spatial data for objects in a surrounding environment of a user. Spatial information of the objects is calculated from spatial data. Characteristically, the spatial information includes a depth-to-color mapping in which distance of objects from the user is mapped to a predetermined viewable representation as set forth above. The depth-to-color mapping is displayer to the user on a head-mountable display wherein distances of the objects from the user are rendered to allow at least partial viewability of the object by the user. Typically, the method is practiced with the augmented reality system set forth above. In particular, the depth-to-color mapping is such that the distance of the objects from a user is mapped to a colored wireframe with edge-enhancement. Moreover, as set forth above, the predetermined color is a pseudocolor or false-color with a plurality of discrete color changes based on distance from the user. In a refinement, the depth-to-color mapping also assists in identifying objects.

The following examples illustrate the various embodiments of the present invention. Those skilled in the art will recognize many variations that are within the spirit of the present invention and scope of the claims.

Results

Ten RP subjects with VA<20/80 or VF<30° performed a highly controlled, reconfigurable obstacle course with AR on or off in a random order (i.e. for the first trial, some had the depth encoding enabled and some had it disabled to avoid learning effects). Using an anonymized video of each test, a masked grader recorded the number of times a person collided with obstacles and also the time it took each subject to complete the course (see Methods section for details of masking). In was found that with AR on, RP subjects make significantly fewer errors in mobility and grasp tasks (50% with p=0.02, 70% with p=0.03). No significant result was reached regarding time to completion.

Prior to testing with RP subjects, preliminary experiments were completed on twelve sighted subjects wearing constricted field of view glasses, finding a significant reduction in mobility and static grasp collisions (66%, p=0.005 and 68-85%, p=0.03). The simulation glasses correctly simulated small VF, but did not, for example, degrade color vision or central vision as can often be the case in RP. The subjects were recruited prior to and independently of the RP experiments as a proof of concept. These experiments are described in the Supplementary Section set forth below and suggest mobility can improve generally for patients with small VF.

Mobility Results

Decrease in Collisions: Mobility

RP subjects had on average 50% fewer collisions with AR on as opposed to AR off (FIG. 2A, p=0.02). Eight of the nine subjects performed better with AR on.

Time to Completion: Mobility

With AR on, RP subjects had a 30% shorter time to completion, but this was not statistically significant. One subject, #5, was unable to complete the obstacle course without the device. Another subject, #9, was unable to identify the endpoint of the maze for four minutes. The result was not significant, with or without normalization based on the subjects' preferred walking speed (FIG. 2B).

Grasp Results

Decrease in Collisions: Grasp

Of the four RP subjects who made grasp errors, each made significantly fewer errors with AR than without. This improvement constituted a 70% increase in grasp performance (p=0.03) (FIG. 2C).

Time to Completion: Grasp

Four of the seven RP subjects completed the grasp experiment in less time with AR than without. The mean improvement was 78% but it was not statistically significant (p=0.09, FIG. 2D).

DISCUSSION

Subjects collided with fewer obstacles with the help of AR pseudocolor in a clinically validated obstacle course with a variety of object sizes and contrasts. All data from every enrolled RP subject are reported in FIG. 2, and only one subject outperformed AR when unaided. As Chung et. al. show, this performance should correspond to increased safety, comfort, and ease of real-world mobility in many low-light environments from restaurants to movie theaters to the great outdoors [38]. Subject 4, for example, reported difficulty walking home from work in the evenings, and routinely tripping over curbs and into bushes. Each subject has a wide range of mobility difficulties, exacerbated after twilight. Subject 9 reported avoiding going out almost every evening due to fear of falling, harming their emotional wellbeing. Such lived experiences are consistently reported by RP subjects [14]. Because the proposed AR aid helps improve subjects' mobility particularly in low-light scenarios, it may profoundly improve quality of life. Similarly, the reported increase in grasp performance may improve confidence in using utensils, household appliances, and other basic tasks.

The methods herein use a rigorous experimental procedure to negate limitations, ensure reproducibility, and mitigate other areas of bias. Starting with the selection of three clinically validated obstacle course configurations, the randomized trial methodology averages out any maze difficulty and learning effects; the randomized, masked grading system removes personal bias; and the structured, audio-guided training procedure ensured consistency in training. Further careful validation may be a necessary step in the clinical implementation of this technology, and these experiments are an important first step establishing clinical utility of AR pseudocolor.

Augmented Reality visual enhancements for low vision mobility have been suggested as an alternative or supplement to traditional low vision aids such as the cane or the guide dog for almost two decades [39]. Hicks et al., in a VR visual aid study, showed significantly improved navigational skill with a simplified depth encoding in grayscale; as future work, they suggest that since people with visual impairments are very skilled at identifying objects with residual vision, an AR approach may provide even more benefit [28]. Furthermore, the methodology of Hicks et al. could be improved by a clinically validated mobility test that controls for illumination, object contrast, learning effects, etc. Still, studies like Hicks et al. are useful precursors for AR visual aids. AR aids pre-Hololens relied on proprietary hardware implementing computer vision algorithms in real-time [40, 41]. More recently, since the development of commercial AR headsets, these methods seem ever-more feasible. For example, Coco-Martin et al. use binocular disparity to calculate depth and encode it as color along depth edges and showed in some preliminary experiments that the device may preserve the preferred walking speed (PWS) of RP subjects [42]. However, the system they developed is proprietary and does not take advantage of state-of-the-art 3D reconstruction methods implemented on commercial AR devices like the Microsoft Hololens. Consequently, depth can only be rendered onto edges, making it difficult for RP patients with already low fields of view to identify the surfaces of obstacles. At the same time as we were performing our experiments, Kinateder et. al. performed an "exploratory study" on four visually impaired people with three different etiologies but used a mobility metric that is neither realistic nor clinically validated: measuring the distance at which a subject first recognizes an obstacle [35]. Thus, prior work indicates that AR may be useful, but fails to optimize a low-vision aid for any particular etiology, show significant results indicating that it will help a population of blind people with mobility, or use a clinically meaningful methodology. Furthermore, there has been no discussion of grasp in AR.

The experiments set forth herein build on the prior work by providing statistically significant mobility and grasp improvements in a population of 10 RP subjects using a methodology based on an FDA-validated clinical study. This study also introduces new technical methods for AR low vision aids: (1) The pseudocolor wireframe is designed to help Retinitis Pigmentosa patients even with significant color deficiencies, and shows that a very coarse color-to-depth map improves mobility even in individuals with very poor color vision; (2) Rather than continuously rendering a surface over the real world, we construct a triangular point mesh using a geometric shader, which preserves the abilities of individuals to perform tasks such as reading text with their normal remaining vision; (3) our wireframe does not go farther than 6 feet (as opposed to infinity), preventing sensory overload and increasing user comfort and wireframe interpretability; and (4) this paper optimizes AR for the specific visual characteristics of RP, and has strong significant results indicating high levels of visual confidence, interpretability, and intuitiveness. This methodology, of designing rendering techniques for specific etiologies of blindness, is promising for future aids, given the results. The improvements in collision rate and depth discrimination arise both from the explicit depth-to-color mapping and from the increase in brightness/contrast provided by AR.

Other intuitive forms of depth encoding should also be studied, such as time-domain oscillation of the brightness, saturation of high-risk objects, audiovisual cues, and tracking the velocity and depth of objects to determine their risk to the subject. Eye-tracking should also be explored, as subjects may not be able to see visual warning signs due to restricted field if they are looking at the wrong part of the screen. A robust aid could incorporate eye-tracking to warn users with directional sound if they cannot see an obstacle and highlight it when they look. Such an eye-tracked aid, which would be possible with the Hololens 2, could thereby take a user's visual field into account both for aid effectiveness and also rendering efficiency.

Future studies to address mobility improvement with higher training and usage time are warranted given the parameters and limitations of this study. The reason we did not achieve significance in time to completion is likely because subjects had not acclimated to the use of the device and we only tested each subject in the obstacle course 2-3 times, in a randomized order, and after extremely limited training. This effect is consistent with previous studies on VR visual aids. Van Rheede et al. quantitatively show that with low training time, their VR visual aid increases hesitation and lowers walking speed; however, they claim that this effect disappears over time [43]. Correspondingly, Hicks et al. show in a user study that after 10 maze trials, subject time to completion is cut in half, while after only one trial, the difference in time to completion is not significant [28]. Our results are consistent with these investigations. Based on these we would expect improvement in time to completion with prolonged use. Future work should quantify how much training is necessary to achieve a benefit in time to completion.

Another limitation of this study is the lack of intra-grader reliability assessment. However, the reviewer was a doctor who was trained in an orientation for how to grade videos. We based our study on Chung et al., which reported an inter-grader reliability of 98% when testing every 3 months; we had only one grader who graded all videos in less than a week, so we expect to have a similarly high reliability [38].

On the technological level, general limitations of Augmented Reality as a low vision aid include poor real-time depth mapping, small field of view, limited battery life, weight, PC tethering, and high cost. Real-time Simultaneous Location And Mapping (SLAM) should be incorporated out of the box in AR systems for dynamic environments, but the Hololens 1 only updated every second. Small field of view forces subjects to crane their heads down to see obstacles. The battery life of the Hololens 1 and 2 are both roughly 2-3 hours, which is not enough time to make it through a workday. Because of the intensive compute requirements of AR, the Hololens and other untethered devices suitable for mobile use are quite heavy. Finally, these devices cost thousands of dollars ($3500 for the Hololens 2), making them inaccessible to patients. If all the above limitations are solved by AR companies, then AR will be a much more effective platform for mobility and grasp aids.

In conclusion, this paper advances the state of this field because, to our knowledge, it is the first study to do three things: (1) Show a statistically significant mobility improvement for patients with RP using a visual AR low vision aid in a test validated by the FDA to correspond with a real-world mobility improvement. (2) Demonstrate a new low vision aid technique, the pseudocolor wireframe. (3) Validate the ability of AR to improve grasp in patients with RP. In total, the contribution of this paper is a new low vision AR methodology (the wireframe), and a tightly-controlled and highly reproducible experiment which shows it can improve the mobility and grasp of subjects with a methodology relevant to clinical and real-world application.

Methods

Device and Method of Encoding Depth

Figure 3A:
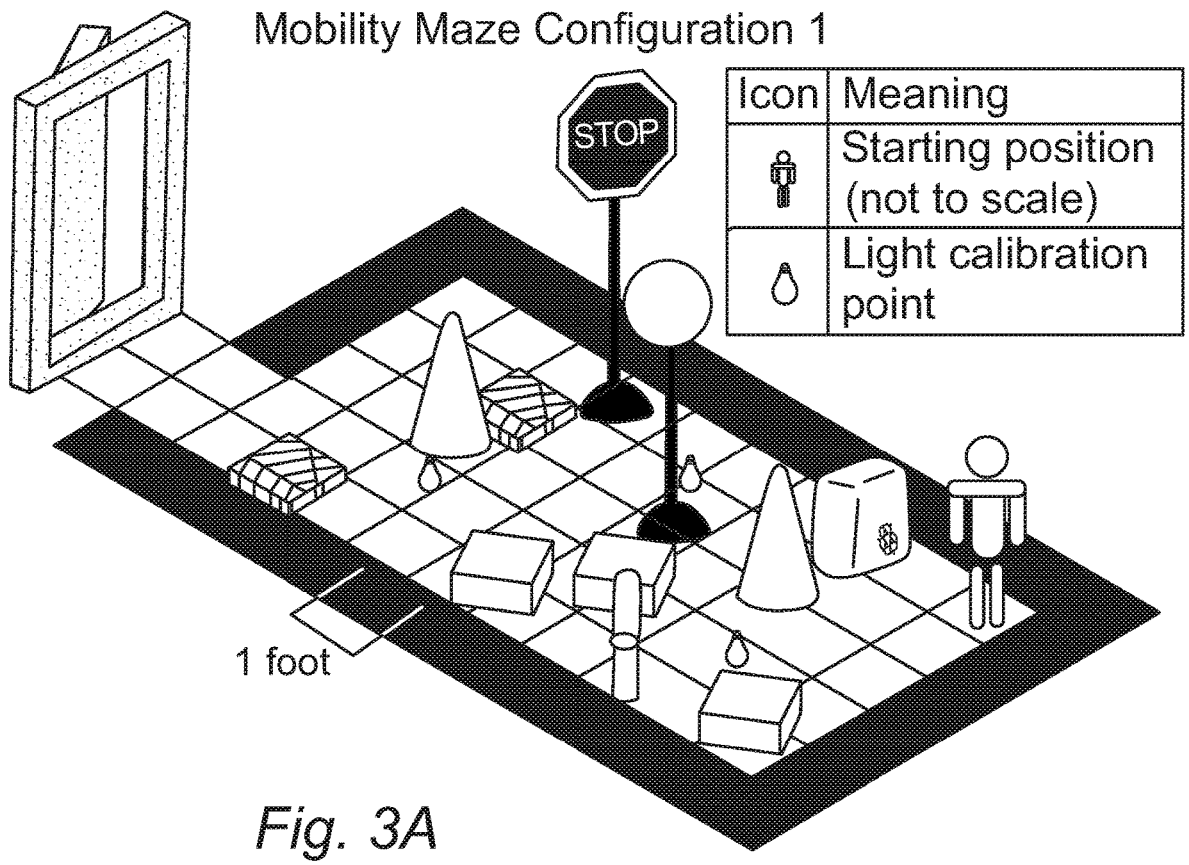
FIGS. 3A, 3B, 3C, 3D, 3E, and 3F. Experimental setup and images of pseudocolor depth encoding. (A) Experimental course configuration one. (B) Grasp experiment setup, with five wooden cylinders and a black backdrop. Subjects are asked to grab the wooden cylinder in the rear without touching the ones in the front. (C) A monocular picture, from the user's point of view, of the pseudocolor encoding. Shows limited field of view. Image artifacts were produced by cell phone camera. (D) Experimental configuration two. (E) Experimental configuration three. (F) CGI rendering of pseudocolor encoding transformed to gray scale. In the mobility experiments, the coarse color map (0-3 ft=red, 3-4 ft=green, 4-5 ft=blue, 5-6 ft=red) was used. However, in the grasp experiments, the color map was finer (0-6 in =white, 6-12 in =green, 12-18 in =blue, 18-24 in =red, not shown).
Figure 3B:
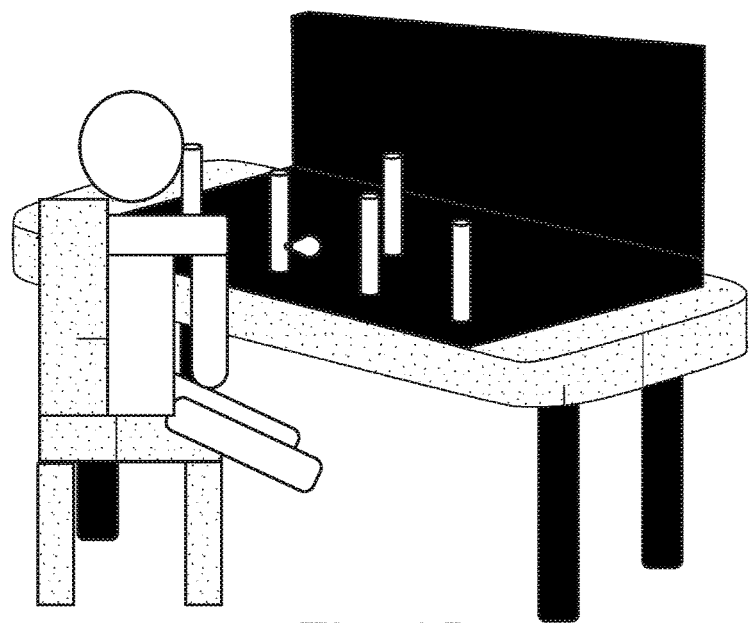
Figure 3C:
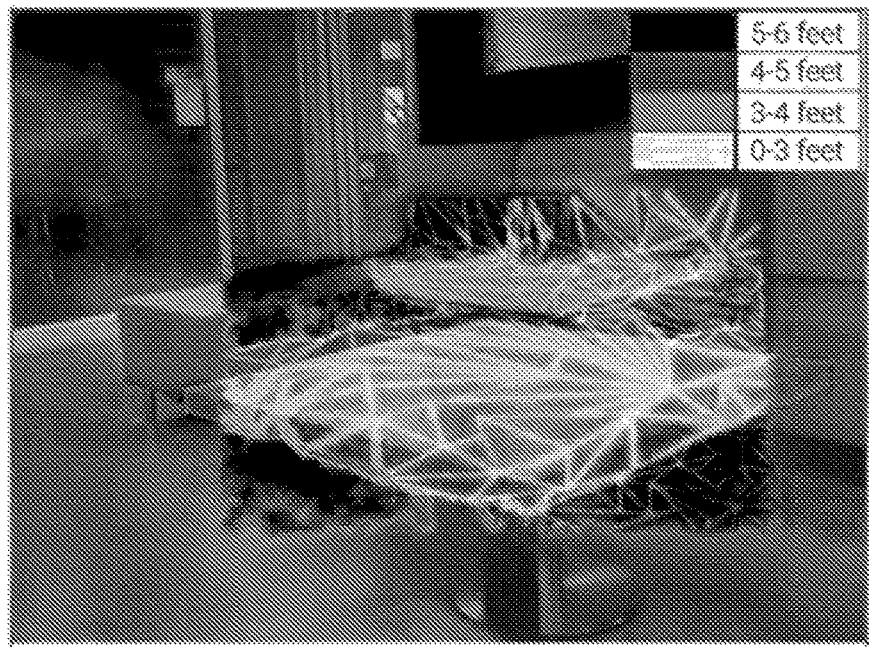
Figure 3D:
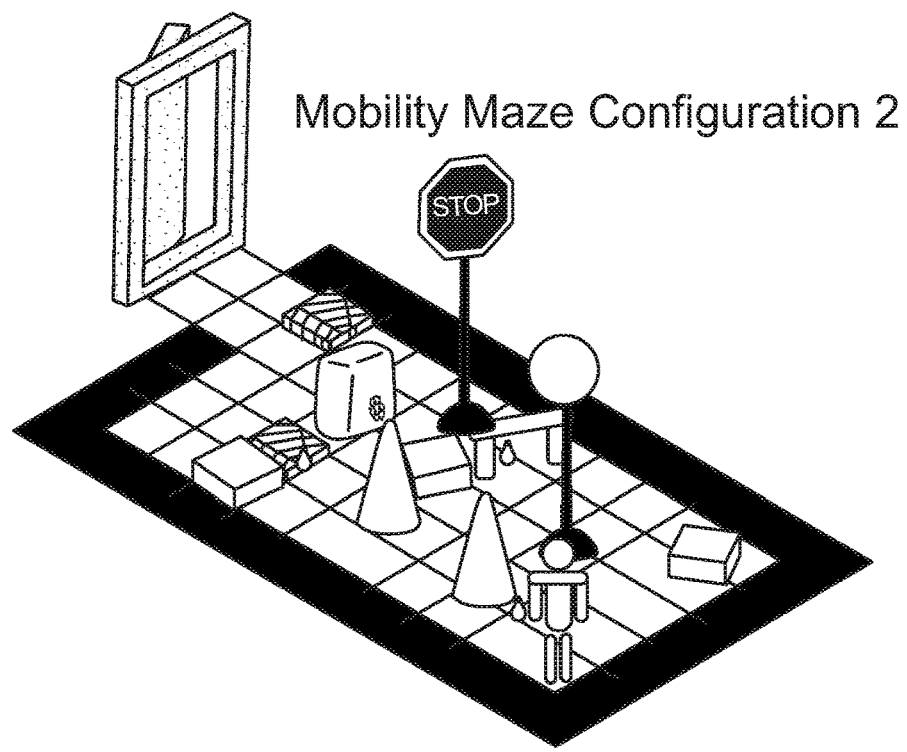
Figure 3E:
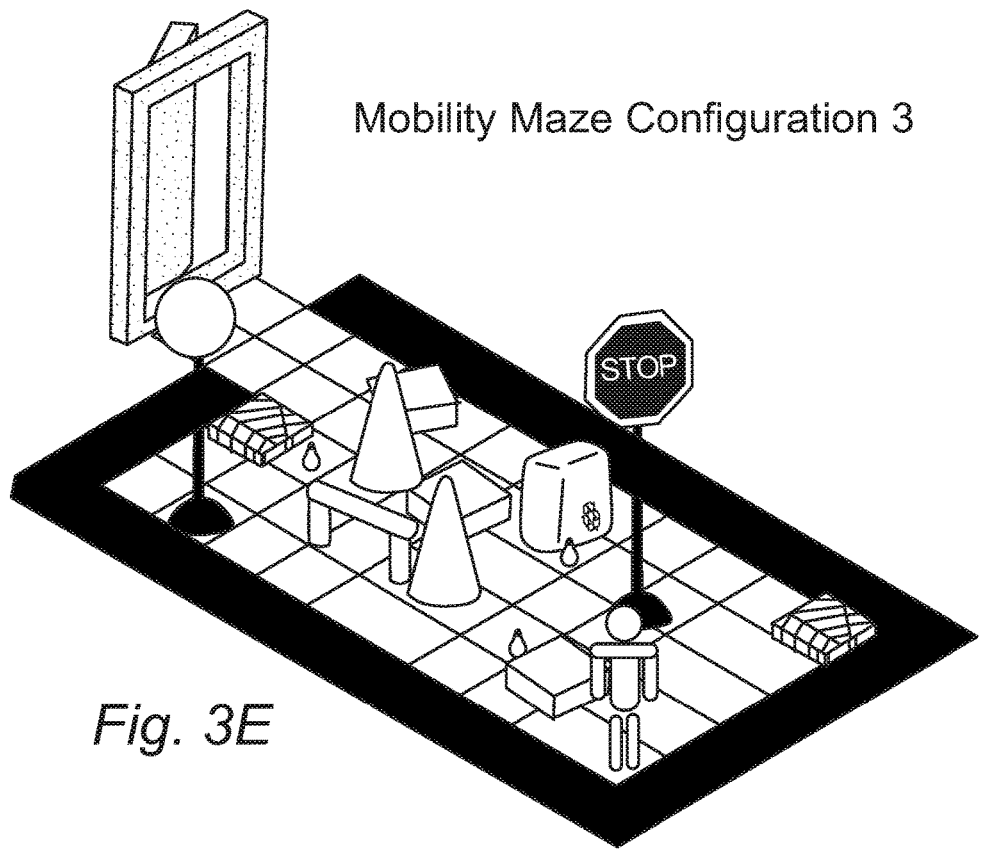
Figure 3F:
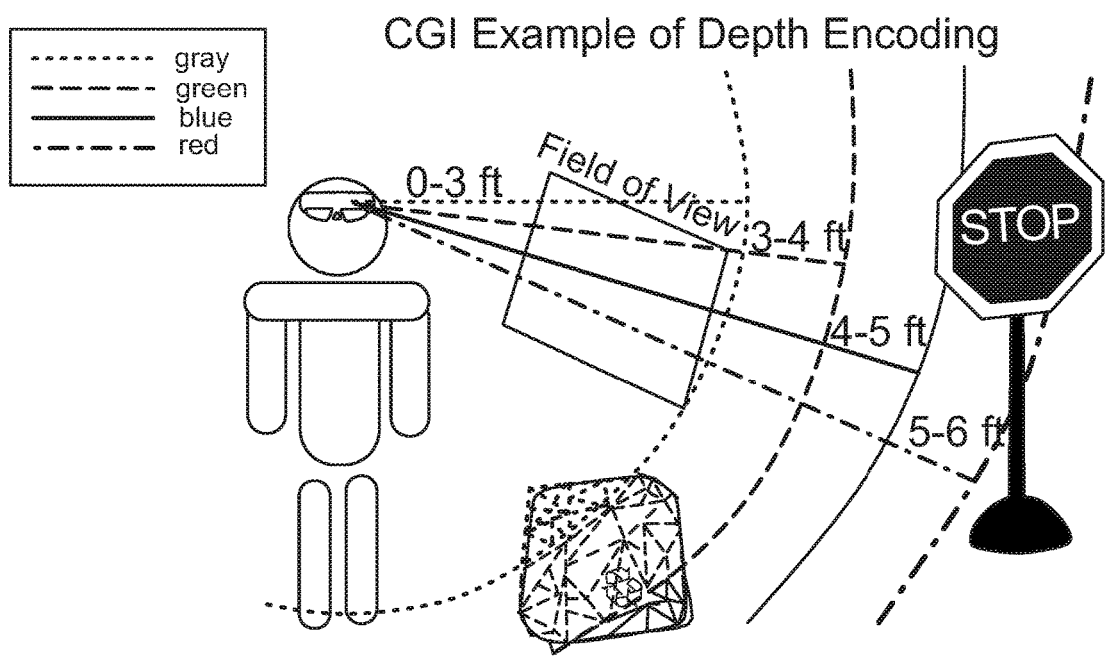

The device used was a Microsoft Hololens 1 [44] and the distance encoding was a form of pseudocolor, or false-color, which mapped depth to four discrete color changes (FIG. 3C, F). The Microsoft Hololens 1 was chosen based on well-documented spatial mapping software in the Microsoft Mixed Reality Toolkit (MMRT), and the fact that it is a stand-alone, freely mobile unit which does not need to be connected to a PC [45]. Testing was performed in Summer 2018, before the Hololens 2 was announced. Using Unity and the MMRT, a triangular polygon mesh was overlaid on top of natural vision and color-coded based on the distance to the user (FIG. 3C, F). In the mobility mode, objects were colored white when an object was less than 3 feet away from the headset, green when objects were 3-4 feet away, blue when objects were 4-5 feet away, and red when objects were 5-6 feet away. Objects farther than 6 feet away were not colored. In the grasp mode, objects were colored white at 0-6 inches away, green at 6-12 in, blue at 12-18 in, and red at 18-24 in. We coded these distances into a geometric shader, then verified their accuracy with a tape measure. Mathematically, points in the triangular mesh and their connectivity are given by the Hololens' internal SLAM algorithm (through the MMRT); we take the edges of the graph and color them by calculating the distance along each line to the user with linear interpolation. The concept can be implemented in many ways, agnostic of rendering details such as the type of mesh or rendering software used. This is enabled easily by Unity or any other rendering engine. The precision of the Hololens was within one centimeter, with a 6.64% error rate. Microsoft has not released information about the smallest object the Hololens can register, as this is also function of the object contrast, lighting, and distance to the object. Roughly, from head height, objects around 2-3 inches in length can be mapped. When rendered on the transparent screens of the Hololens headset, this wireframe allowed one to see the shape, color, and features of the original object as well as its color-encoded distance, as in FIG. 3C. The depth encoding was calibrated in brightness before each trial to ensure both the obstacles and the pseudocolor were simultaneously visible. A video of the encoding was recorded [3].

We chose this method of depth encoding for the following reasons: (1) Though RP often severely degrades color vision, we ordered the selection of colors based on the spectral sensitivity of the human eye [46]. The most common axis of deficiency is tritanopia, so we did not include a blue-yellow edge in our mapping [47]. This is physically consistent because though RP is a rod-cone dystrophy, it affects the rods more [4]. During testing, even subjects with anarchic D-15 color test scores were able to easily distinguish between the colors displayed by the headset. (2) The decreased visual field of RP subjects necessitates a depth encoding dense enough to be seen almost at all times; if only edges were enhanced, objects with few edges would be difficult to see. Clinical results have shown that advanced RP patient mobility performance is highly dependent on contrast sensitivity. Thus, edges are very important to RP patients, so an effective aid must both enhance edges when they are in the field of view and also supplement the lack of edges when there are none in the field [48]. We use color to perform this substitution. (3) It has long been known that object color is important for edge identification and motion tracking [49, 50]. A system that completely overlaps objects' natural color would interfere significantly with these cues. Our approach splits the difference, co-opting some of the perceptual edge-enhancing properties of color for the purposes of depth detection while attempting to retain the object's natural color which can be seen through the wireframe.

The Microsoft Hololens 1 was chosen for ease of development and mobility use, as at the time of testing, the Magic Leap One headset had not been released. Other headsets, like the Meta 2 and Epson Moverio, are tethered to a computer or smartphone, and we wanted to avoid this for mobility testing. Moreover, the Hololens has a fairly stable inbuilt SLAM algorithm compliant with Unity [51]. The Hololens had one drawback, which is a very small field of view (34°) compared to other headsets like the Meta 2 (80-90°). Consequently, subjects use head tracking while wearing the device to identify obstacles, and we had to optically align subjects by asking them if they could identify all four corners of the Hololens' virtual screen and adjusting the headset manually. With larger field of view, eye-tracked aids could be even more effective.

Obstacle Course Design

Visually impaired subjects completed two tests: an obstacle course completion test and a grasp experiment test (FIG. 3A, B, D, E). The obstacle course is similar to a functional test used in the FDA-validated Voretegene Neparvovec-rzyl clinical trial [38].

Though scientists have designed several obstacle courses to assay low and ultra-low vision mobility [52, 53, 54, 55, 56], the only obstacle course used in an FDA-validated clinical trial for RP as a functional test is described by Chung et. al. This obstacle course and accompanying methodology was the foundation for this paper's mobility methods. Special overhead lighting controlled for luminance and objects ranged in size, height, location, and contrast. All configurations of the course are the same length (19.6 m) when navigating the best path by straight lines. The course was modified slightly in our study, removing the requirement that subjects navigate by reading arrows and the black hole obstacles because this was not relevant to the testing of the obstacle avoidance device. FIGS. 3A,D,E describe the three configurations of the obstacle course.

Grasp Experiment Design

In the grasp experiments, subjects were asked to grasp a wooden peg, located 18 inches behind four other wooden pegs, without touching any of the front pegs (FIG. 3B). The four front pegs were 7 inches apart. The background was black.

Randomization and Grading

Figure 4:
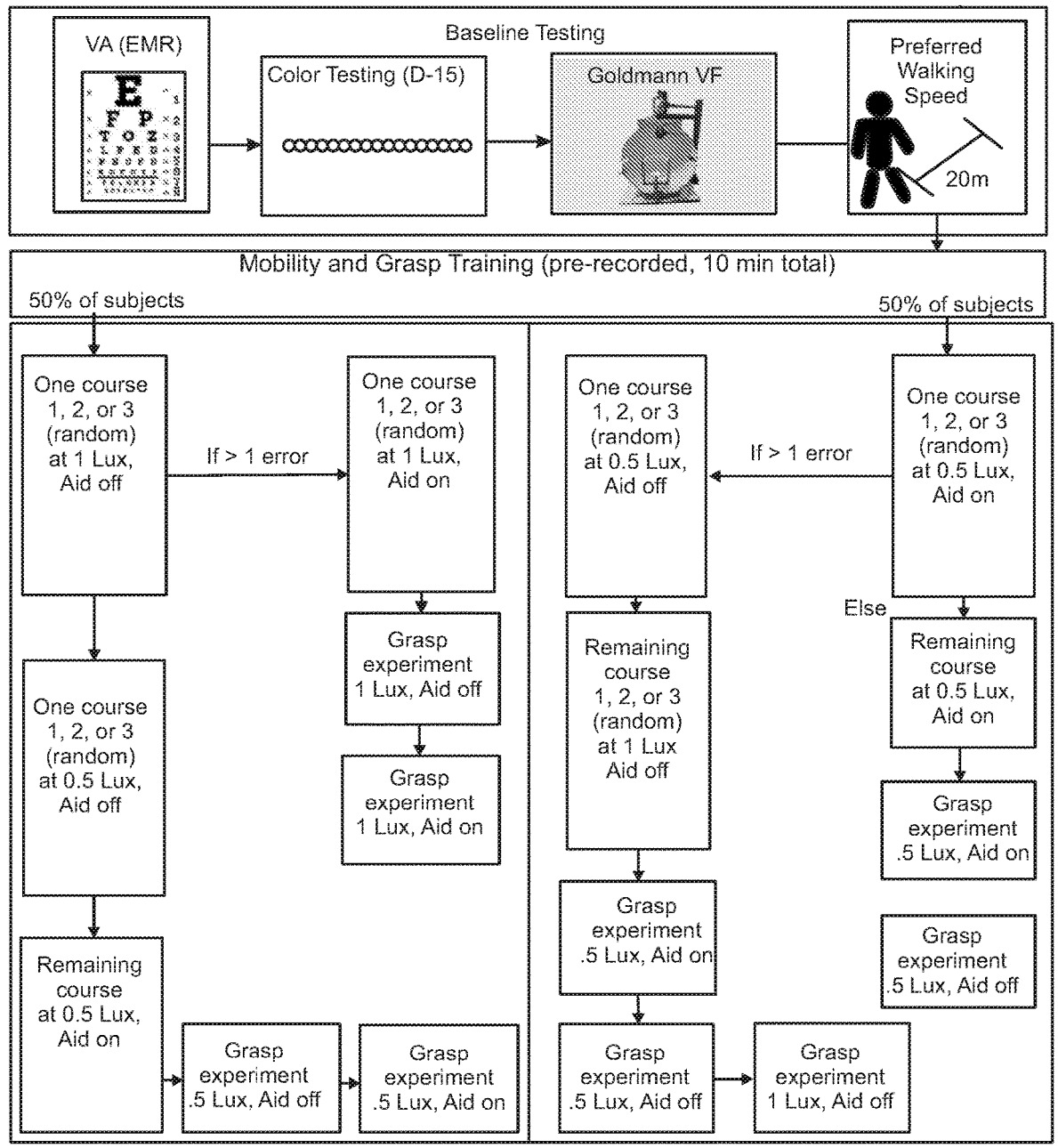
FIG. 4. Flowchart of the experimental procedure. Subjects begin by completing baseline testing, then complete a standard training sequence using audiotapes, and then proceed to one of two experimental protocols, randomizing the order of AR usage. Each subject completes course 1, course 2, and course 3 exactly once in a random order.

Data collection followed the flowchart in FIG. 4. All experiments were completed with the University of Southern California Institutional Review Board approval, in compliance with regulations, and with informed consent from all subjects. Both mobility and grasp experiments were videotaped and later graded by a single masked grader who counted errors (anytime an obstacle was touched) and did not know any information about experimental variables such as whether the device was in use or not. Mobility experiments were videotaped from two angles. Videos were given to the grader with random number generated titles and were graded in random order. The order of obstacle course administration was randomized to avoid learning effect and control for the relative difficulty of each course. The order of lighting levels was randomized. The order of device usage was randomized. Subject identity and AR device were obfuscated through Gaussian facial blur in Adobe Premiere to avoid bias. Time was started when a researcher said "Go", and time was stopped when the subject touched the door at the end of the maze. Patients were not dark adapted before beginning obstacle course testing or grasp testing and returned to standard lighting for 10 minutes between each test. The Hololens was worn to control for its tint in all tests, and turned off or on to test the encoding.

Clinical Endpoints and Eligibility

The primary clinical endpoints were: (1) Reduction in obstacle collision rate during mobility and grasp. (2) Reduction in time taken to successfully complete obstacle courses and grasp experiments. Time taken to complete these tasks is a conservative clinical indicator due to limited training. The inclusion criteria were: (1) Advanced stage RP (or any pigmentary retinopathy) with VA of <20/80 and/or VF of <30° using Goldmann IIIe4 in the better seeing eye. (2) Willingness to adhere to protocol. (3) Written consent. (4) Evaluability on mobility testing. The exclusion criteria were: (1) Inability/unwillingness to meet requirements of the study. (2) Incapability of performing mobility testing (the primary efficacy endpoint) for reason other than poor vision, including physical or attentional limitations. We did not include any subjects with optical opacification, such as visually significant cataracts or vitreous opacities, or retinal gliosis. Subjects were not be excluded based on their gender, race, or ethnicity.

Baseline Vision Testing and Training

Figure 7:
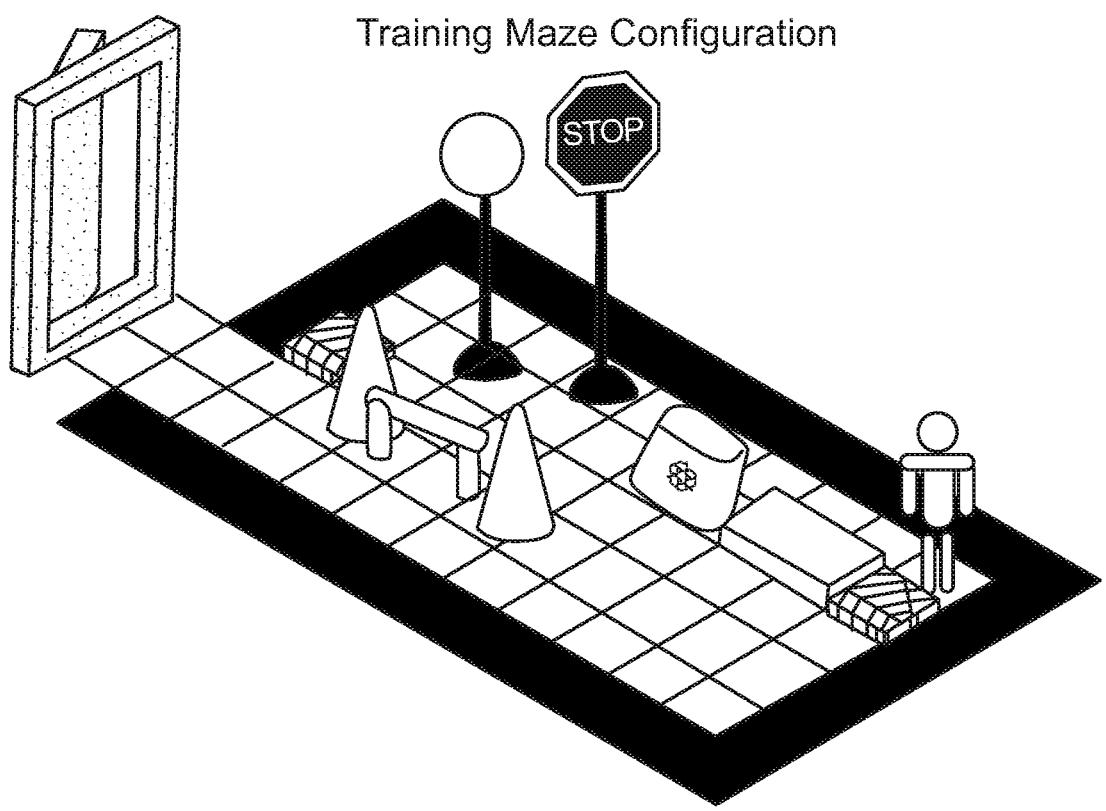
FIG. 7. Training Maze Configuration. This is the maze that subjects used during training, along with the included audiotape. The training was done in normal office-level lighting. The orange person is the start and the door is the endpoint.

A flowchart of the full training and testing pipeline is included in FIG. 4. Subjects first took a Farnsworth D-15 color vision test [57] and a Goldmann kinetic visual field with IIIe4 stimulus (a bright white dot about ½° in diameter). Raw data is included in FIG. 8. Subjects were then asked to walk a 20 m hallway twice at their preferred walking speed (PWS). The second speed measurement was recorded. For the purposes of statistical analysis, each subject's time to completion was divided by their PWS. This did not ultimately affect results. Subjects then completed an audiotape training sequence which guided them through a training obstacle course (FIG. 7) and grasp experiment. The audiotape contained specific navigational instructions and instructions on how to interpret the pseudocolor encoding. If subjects had trouble following the audiotape (e.g. due to deafness), a researcher ensured the subject fully understood before moving on. Subjects were trained for <10 min in standard lighting.

Analysis of Subjects

Figure 2:
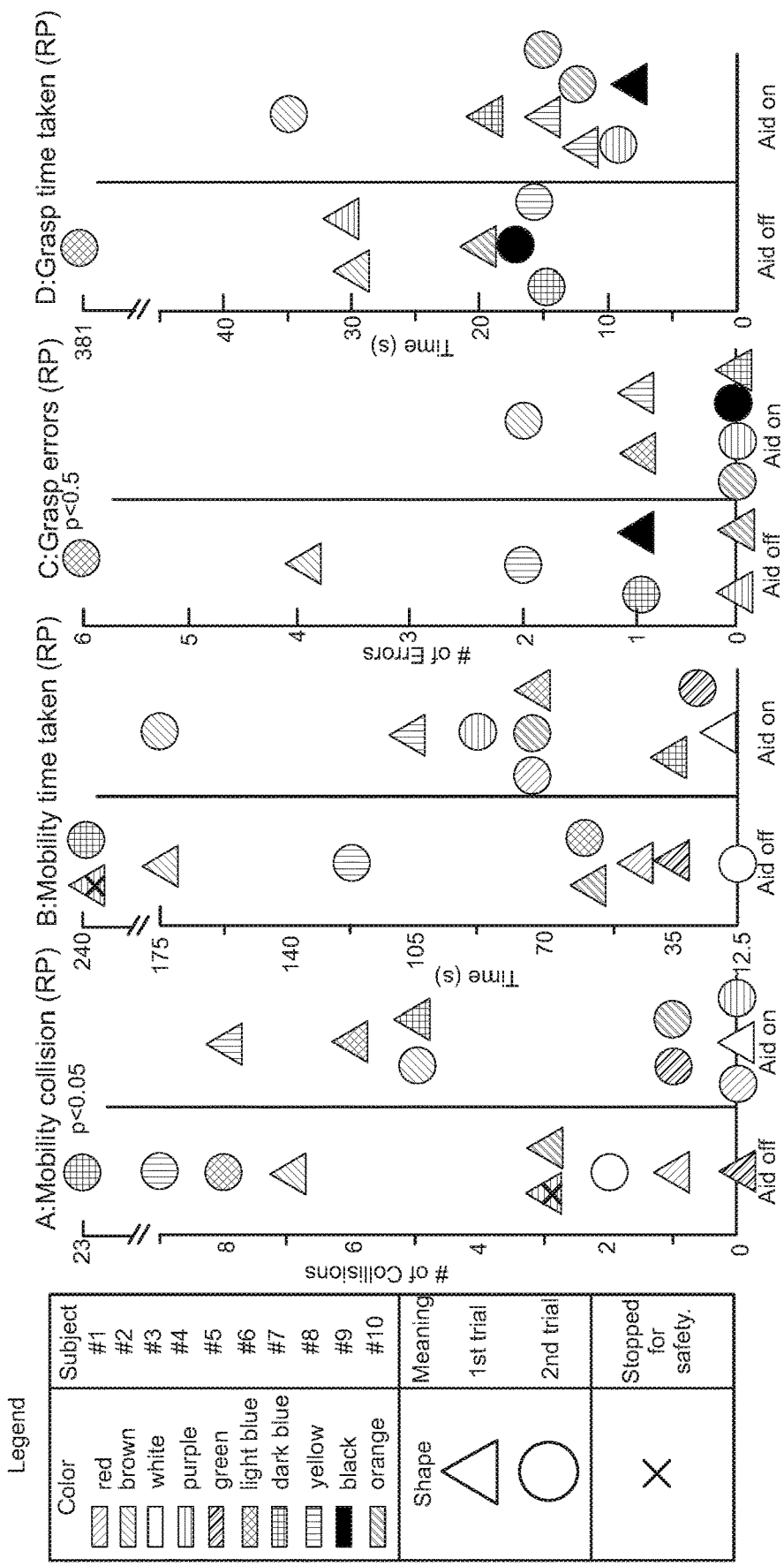
FIGS. 2A, 2B, 2C, and 2D. Results from RP subjects. In these plots, each color corresponds to a different subject. In these figures, the color are represented by various hashes. "1st trial" and "2nd trial" refer to whether the subject was tested with AR first or second temporally; for example, subjects with a triangular shape in the "Aid on" column were tested with the pseudocolor encoding on first. The vertical axis is either the number of collisions during course performance or the time taken to complete the course. The horizontal axis, which has two discrete values, denotes whether AR was off or AR was on for that trial. (A) Number of collisions during obstacle course testing of eligible subjects with RP. (B) Time taken to complete obstacle course testing by eligible RP subject. (C) Number of errors (misidentification, collision, etc.) during RP grasp experiment. (D) Time taken to complete grasp experiment by eligible RP subject. An expanded version of this figure with bar charts is included as FIG. 9 for interpretability.

All enrolled patients who met the inclusion criteria were tested, and their results reported. Before testing, the following baselines were administered: preferred walking speed, D-15 color vision test, and Goldmann visual field using a IIIe4 stimulus. Visual acuity was taken from medical records: the latest visual acuity was selected. One subject was excluded due to too large a visual field (35°) in the left eye. The rest of the subjects were included in the study. All patients, even those with extreme D-15 color deficits, were able to recognize the colors on the AR screen. Subjects 3 and 5 had to leave before grasp experiments were complete due to time constraints. Subject 4 was stopped for safety during mobility experimentation without aid and thus was assigned the same completion time as subject 7, and the raw error count was used for analysis (so, we underestimate the improvement this subject experienced with AR aid). Subject 9 did not follow instructions for the mobility experiment. In FIG. 2, these subjects are marked with asterisks. Table 1 summarizes subject information, including phakia (presence of natural crystalline lens) and presence of cystoid macular edema (CME). The information is included for completeness, but the focus is primarily on functional vision (VF, VA, color), as our references indicate that these functional vision measures are primarily responsible for mobility challenges regardless of etiology, both in heterogeneous populations and also in RP [58, 59]. Subject 6 has pigmentary retinopathy, a condition known to "mimic retinitis pigmentosa," as it has the same symptoms: "retinal dystrophic and pigmentary changes and the frequent association of night blindness, reduction of visual acuity, constriction of visual fields, and abnormal electroretinographic (ERG) findings [6]". We note this here but refer to all subjects as RP subjects elsewhere as the conditions are exactly the same for the purposes of this study.

Statistics

A two-sided Wilcoxon signed rank test was used for all statistical findings [60].

Supplementary Materials

Supplementary Section 1: Preliminary Experimental Results and Methodology on Sighted Subjects Results The preliminary data indicated a 68% decrease in mean number of collisions when normal sighted subjects with constricted field glasses used AR in mobility with $p=0.0051$ (FIG. 5A). No improvement was measured in time to completion for any experiment (FIG. 53). The one- and two-handed grasp experiments indicate collision improvements of 85% and 68% respectively, with $p=0.03$. No improvement was measured in the dynamic grasp experiment (FIG. 5C).

Methods

Figure 8:
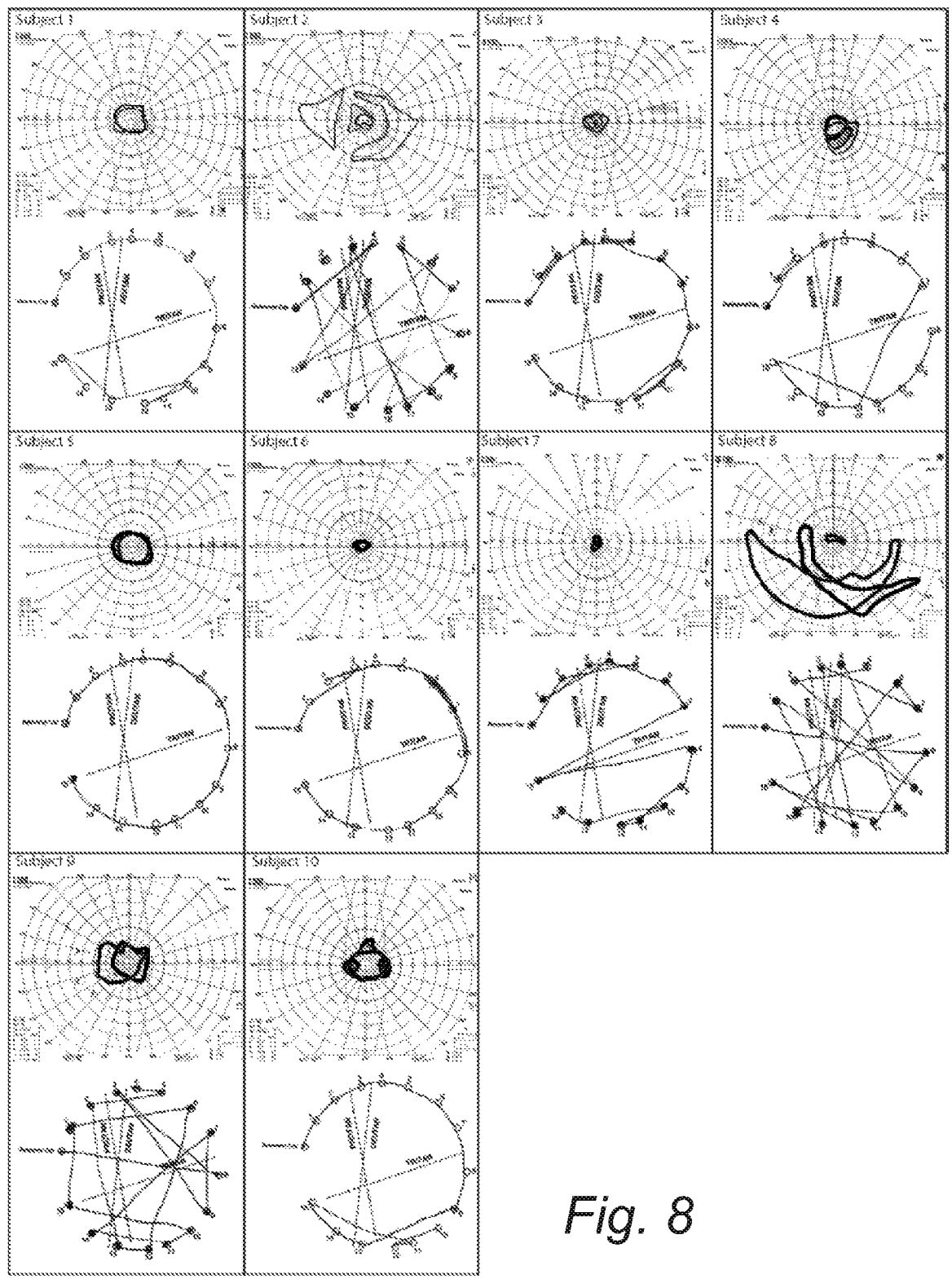
FIG. 8. Goldmann Visual Fields and Farnsworth D-15 Color Test of RP subjects. Visual fields and color tests were all administered by the same technician on the day of testing. The visual fields are digitally enhanced for clarity, with blue corresponding to the left eye and red corresponding to the right eye visual field. When visual field is reported for eligibility purposes, we look at the largest meridian. D-15 color tests are all binocular.
Figure 9A:
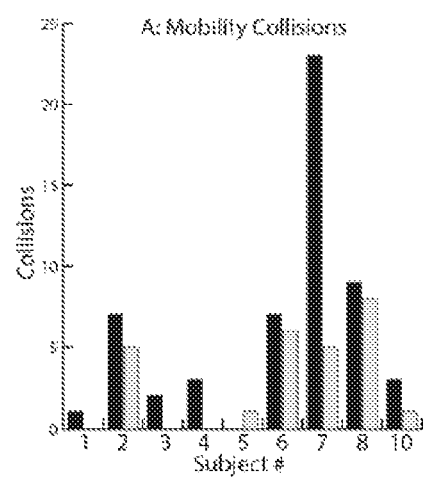
FIGS. 9A, 9B, 9C, and 9D. Mobility and Grasp Results. Expanded version of FIG. 2 in the main text, with a bar chart for each experiment. A) Collisions in mobility. B) Collisions in grasp. C) Time to completion for mobility. D) Time to completion for grasp.
Figure 9B:
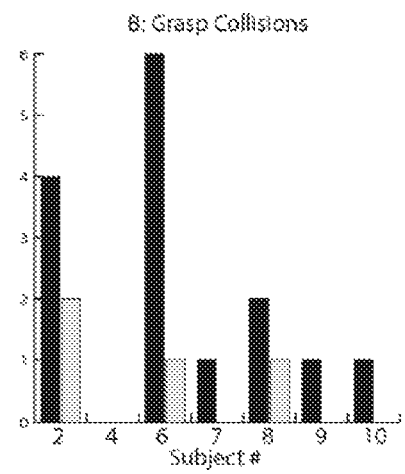
Figure 9C:
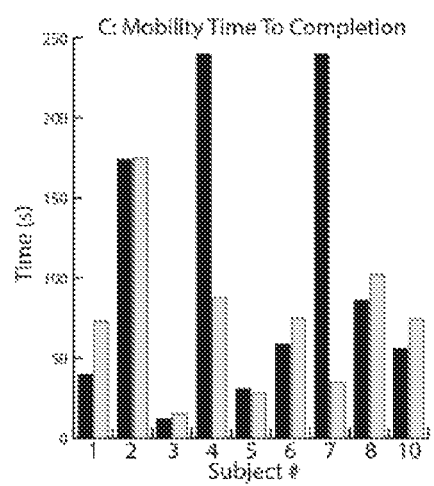
Figure 9D:
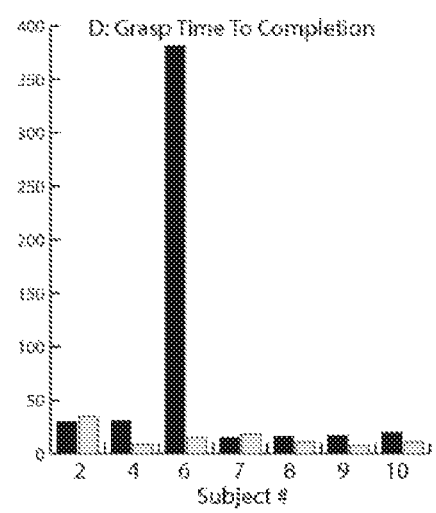

In preparation for the human subject study on visually impaired individuals, two sets of experiments were performed to determine the effectiveness of AR pseudocolor encoding on sighted volunteers wearing glasses which simulated low visual field. The volunteers wore RP simulation glasses (Good-Lite VisualEyes Vision Simulator Glass, Peripheral Field Loss Simulator), which were further occluded with black cardstock to achieve a VF between 20-40 degrees (FIG. 8). Volunteers wore the simulation glasses in between the AR headset and their eyes. Subjects enrolled in this study had no visual impairments and 20/20 vision.

Figure 6A:
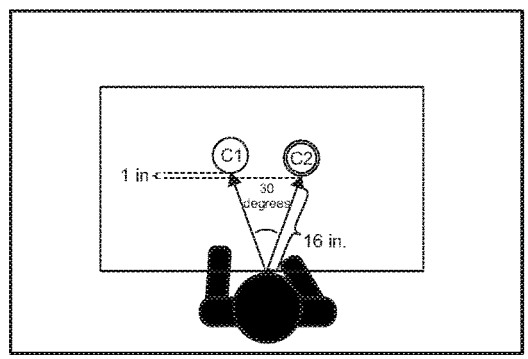

First, subjects were placed in the RP Simulation glasses. Then, the Hololens was worn on top of the RP simulation glasses (the simulation glasses were in between the screen of the Hololens and the user's eyes). Subjects were allowed to wear the Hololens with our visual encoding for a maximum of 10 minutes before they were brought to the testing area. Subjects were not trained in a standard manner, but rather asked to explore a space in standard office lighting with the headset. After time was up, subjects were blindfolded and led to the testing area, where they began obstacle course testing. The order of AR usage was randomized to avoid learning effects (i.e. some subjects used the encoding first and did baseline testing second). The order of the courses was randomized to average for course difficulty. Obstacle courses were of standard length (36 ft) with 10 standard obstacles of varying sizes and colors to assay the effect of the device on collision rate and time taken to traverse a course. Time was stopped when the subject sat in the chair at the end of the course. The courses are described in FIGS. 6D and 6E. Subjects start at the red dot and go to the blue dot.

Sighted subjects were also asked to perform three grasp experiments. The first experiment is described in FIG. 6A.

Two thick cylindrical dowels were placed in front of the user in the geometric configuration shown in the image. Either cylinder 1 (C1) or cylinder 2 (C2) was displaced by 1 inch with respect to the other. The subject was led blindfolded to the testing table while wearing the RP simulation glasses. Then, depending on randomization, they were asked to grasp the closest cylinder with AR on or off. As set forth above, results were compared both with respect to error count (incorrect cylinder or collision) and also time to completion. Note that collisions are less clear in the context of grasp; any unsure touches, missed grabs, or fumbles were counted as errors.

Figure 6B:
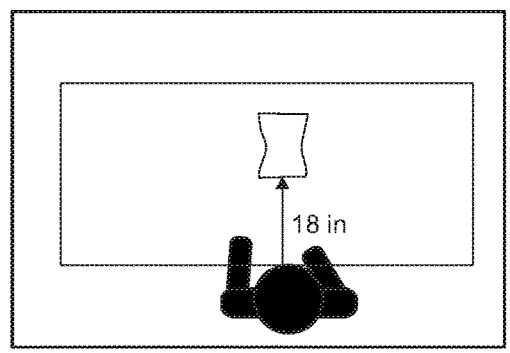

The second experiment, pictured in FIG. 6B, was to test two-handed coordination and spatial understanding. A rectangular bag was placed 18 inches in front of the subject and they were asked to grasp it with both hands at the same time. Time was started when a researcher said "go," at which the subject opened their eyes, and stopped when both hands firmly grasped the bag. The setup and grading protocols were the same as the one-handed grasp experiment.

Figure 6C:
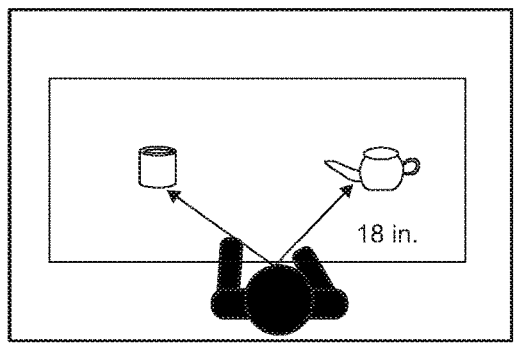
Figure 6D:
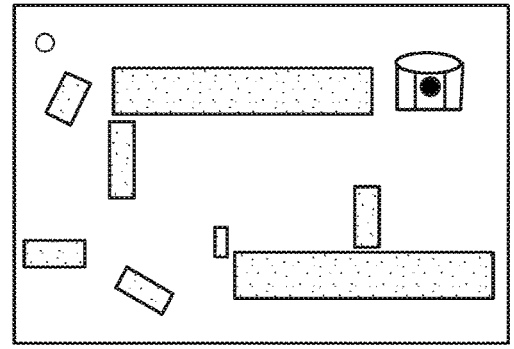
Figure 6E:
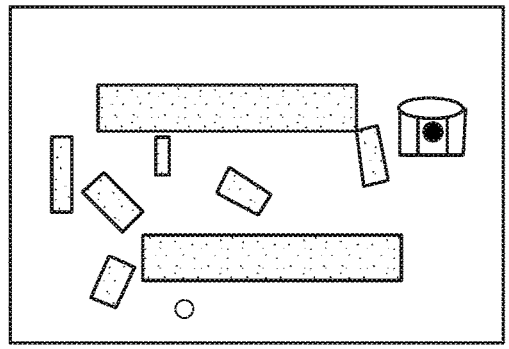

Subjects were then asked, in experiment three pictured in FIG. 6C, to perform a dynamic task, where they moved objects to perform an objective. Specifically, subjects were asked to perform the action of "pouring a pitcher" of tea into a cup. The pitcher was empty, but they were asked to grasp its handle and mimic pouring it into the cup. Time was started at a researcher's "go," and stopped when the pitcher was returned to its starting position. The setup and grading protocols were the same as the one-handed grasp experiment.

DISCUSSION

The decreased collisions in mobility and grasp indicated that this device would be useful for RP patients, and motivated our main study. In retrospect, sighted subjects seem to improve much more than visually impaired subjects when using the AR device; this may be a product of increased color/contrast vision in sighted subjects, even when wearing the RP simulation glasses. Refer to the main text for the explanation of the non-significance of time to completion results reported in FIG. 5B, as these subjects also had limited training time. The fact that subjects collided with fewer objects using AR than not in the static tasks but not the dynamic "pitcher" task indicates that the real-time applicability of this system is very limited, possibly due to the slow update time (around 1s) of the internal SLAM algorithm. The limitations of this study include the lack of a masked reviewer, lack of intra-grader reliability testing, and lack of clinical validation of the tests. It is unclear, for example, whether the grasp experiments are indicative of real-world performance. Furthermore, it is unclear whether the mobility tests we used correspond to real-world performance. However, this data is still useful as proof of concept towards a clinically validated methodology on RP subject.

Notes on video of encoding: A researcher wearing RP simulation glasses navigated the maze. We used the Hololens' mixed reality recording module to record this video, but this had limitations: lines colored "black" appeared on the recording, but would not show up in real life, as black renderings are transparent in AR. Also, the recording was only taken in the field of view of the device (34 degrees diagonally). Finally, increasing the computational load of the headset by recording data increases the probability of a "glitch," which happens a few times in this video.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1. Parmeggiani, F. Clinics, epidemiology and genetics of retinitis pigmentosa. Curr. genomics 12, 236-237, https://doi.org/10.2174/138920211795860080 (2011).
2. Haim, M. Epidemiology of retinitis pigmentosa in denmark. Acta Ophthalmol Scand Suppl 1-34 (2002).
3. Daiger, S. P., Bowne, S. J.& Sullivan, L. S. Perspective on genes and mutations causing retinitis pigmentosa. Arch Ophthalmol 125, 151-8, https://doi.org/10.1001/archopht.125.2.151 (2007).
4. Hamel, C. Retinitis pigmentosa. Orphanet journal rare diseases 1, 40 (2006).
5. Hartong, D. T., Berson, E. L. & Dryja, T. P. Retinitis pigmentosa. The Lancet 368, 1795-1809 (2006).
6. Qian, Y., Lewis, R. & Traboulsi, E. Pigmentary retinopathy in systemic inherited disease. Oxford Monographs On Medical Genetics 61, 603-638 (2012).
7. Vernon, M. Usher's syndrome-deafness and progressive blindness: clinical cases, prevention, theory and literature survey. J. chronic diseases 22, 133-151 (1969).
8. Free-Photos. City street urban traffic busy. [Online; last accessed; Pixabay license at, https://pixabay.com,service/license/permits free use with modification for commercial and non-commercial purposes.] (1 Jul. 2019).
9. Black, A. et al. Mobility performance with retinitis pigmentosa. Clin. optometry, experimental 80, 1-12 (1997).
10. Geruschat, D. R., Turano, K. A.& Stahl, J. W. Traditional measures of mobility performance and retinitis pigmentosa. Optom. Optom. vision science: official publication Am. Acad. 75, 525-537 (1998).
11. Haymes, S. A., Johnston, A. W. & Heyes, A. D. Relationship between vision impairment and ability to perform activities of daily living. Ophthalmic Physiol Opt 22, 79-91 (2002).
12. Kalloniatis, M. & Luu, C. Light and dark adaptation (2007).
13. Alexander, K. R. & Fishman, G. A. Prolonged rod dark adaptation in retinitis pigmentosa. The Br. journal ophthalmology 68, 561-569 (1984).
14. Prem Senthil, M., Khadka, J. & Pesudovs, K. Seeing through their eyes: lived experiences of people with retinitis pigmentosa. Eye 31, 741, https://doi.org/10.1038/eye.2016.315 (2017).
15. Sugawara, T. et al. Relationship between peripheral visual field loss and vision-related quality of life in patients with retinitis pigmentosa. Eye 24, 535, https://doi.org/10.1038/eye.2009.176 (2009).
16. Bittner, A. K., Edwards, L. & George, M. Coping strategies to manage stress related to vision loss and fluctuations in retinitis pigmentosa. Optom. J. Am. Optom. Assoc. 81, 461-468, https://doi.org/10.1016/j.optm.2010.03.006 (2010).
17. Ghali, N. I. et al. Virtual reality technology for blind and visual impaired people: reviews and recent advances, 363-385 (Springer, 2012).

18. Everingham, M., Thomas, B., Troscianko, T. & Easty, D. Neural-network virtual reality mobility aid for the severely visually impaired. In Proceedings of the 2nd European Conference on Disability, Virtual Reality and Associated Technologies, 183-192 (1998).
19. Bowman, E. L. & Liu, L. Individuals with severely impaired vision can learn useful orientation and mobility skills in virtual streets and can use them to improve real street safety. Plos One 12, e0176534 (2017).
20. Younis, O., Al-Nuaimy, W., A. Al-Taee, M. & Al-Ataby, A. Augmented and virtual reality approaches to help with peripheral vision loss (2017).
21. Bostelman, R., Russo, P., Albus, J., Hong, T. & Madhavan, R. Applications of a 3d range camera towards healthcare mobility aids. In IEEE International Conference on Networking, Sensing and Control, 416-421, https://doi.org/l0.1109/ICNSC.2006.1673182 (2006).
22. Blessenohl, S., Morrison, C., Criminisi, A. & Shotton, J. Improving indoor mobility of the visually impaired with depth-based spatial sound. In IEEE International Conference on Computer Vision Workshop (ICCVW), 418-426, https://doi.org/10.1109/ICCVW.2015.62 (2015).
23. Aladrén, A., López-Nicolás, G., Puig, L. & Guerrero, J. J. Navigation assistance for the visually impaired using rgbd sensor with range expansion. IEEE Syst. J. 10, 922-932, https://doi.org/10.1109/JSYST.2014.2320639 (2016).
24. Lee, Y. H. & Medioni, G. Wearable rgbd indoor navigation system for the blind. In Agapito, L., Bronstein, M. M. & Rother, C. (eds) Computer Vision—ECCV Workshops, 493-508 (Springer International Publishing) (2014).
25. Lee, Y. H. & Medioni, G. Rgb-d camera based navigation for the visually impaired. In Proceedings of the RSS (2016).
26. Dunbar, B. et al. Augmenting human spatial navigation via sensory substitution. In IEEE MIT Undergraduate Research Technology Conference (URTC), 1-4, https://doi.org/10.1109/URTC.2017.8284172 (2017).
27. Parikh, N., Itti, L., Humayun, M. & Weiland, J. Performance of visually guided tasks using simulated prosthetic vision and saliency-based cues. J. neural engineering 10, 026017 (2013).
28. Hicks, S. L. et al. A depth-based head-mounted visual display to aid navigation in partially sighted individuals. PLOS ONE 8, 1-8, https://doi.org/10.1371/journal.pone.0067695 (2013).
29. Younis, O., Al-Nuaimy, W., Alomari, M. H. & Rowe, F. A hazard detection and tracking system for people with peripheral vision loss using smart glasses and augmented reality. Int. J. Adv. Comput. Sci. Appl. 10, https://doi.org/10.14569/IJACSA.2019.0100201 (2019).
30. Striem-Amit, E. Neuroplasticity in the blind and sensory substitution for vision. Hebr. Univ. Jerusalem, Dep. neurobiology (2014).
31. Chapter 7 restoring vision to the blind: Advancements in vision aids for the visually impaired. Transl. vision science & technology 3, 9-9, https://doi.orgi10.1167/tvst.3.7.9 (2014).
32. Liu, Y., Stiles, N. R. & Meister, M. Augmented reality powers a cognitive assistant for the blind. eLife 7, e37841, https://doi.org/10.7554/eLife.37841 (2018).
33. Ribeiro, F., Florencio, D., Chou, P. & Zhang, Z. Auditory augmented reality: Object sonification for the visually impaired (2012).
34. Wang, H. et al. Enabling independent navigation for visually impaired people through a wearable vision-based feedback system. In IEEE International Conference on Robotics and Automation (ICRA), 6533-6540, https://doi.org/10.1109/ICRA.2017.7989772(2017).
35. Kinateder, M. et al. Using an augmented reality device as a distance-based vision aid—promise and limitations. J Optom. Sci. Vis. 95, 727 (2018).
36. Everingham, M. R., Thomas, B. T. & Troscianko, T. Wearable mobility aid for low vision using scene classification in a markov random field model framework. Int. J. Hum. Comput. Interact. 15, 231-244, https://doi.org/10.1207/S15327590IJHC1502_3 (2003).
37. Younis, O., Al-Nuaimy, W., Rowe, F. & Alomari, M. H. A smart context-aware hazard attention system to help people with peripheral vision loss. Sensors 19, https://doi.org/10.3390/s19071630(2019).
38. Chung, D. C. et al. Novel mobility test to assess functional vision in patients with inherited retinal dystrophies. Clin Exp Ophthalmol 46, 247-259, https://doi.org/10.1111/ceo.13022 (2018).
39. Peli, E. Augmented vision for central scotoma and peripheral field loss. Vis. Rehabil. Assessment, Interv. Outcomes. Lisse, Netherlands: Swets Zeitlinger 70-4 (2000).
40. Toledo, F. J., Martinez, J. J., Garrigos, F. J., Ferrandez, J. M. & y Proyectos, T. d. C. Augmented reality system for visually impaired people based on fpga. In Proc. 4th IASTED Int. Conf. on Visualization, Imaging and Image Processing, Marbella, Spain, 715-723 (2005).
41. Toledo, F. J., Martinez, J. J., Garrigós, F. J. & Ferrández, J. M. An augmented reality visual prothesis for people affected by tunneling vision. In International Work-Conference on the Interplay Between Natural and Artificial Computation, 319-326 (Springer, 2005).
42. Coco-Martin, M. B. et al. Development and evaluation of a head-mounted display system based on stereoscopic images and depth algorithms for patients with visual impairment. Displays 56, 49-56, https://doi.org/10.1016/j.displa.2019.01.002 (2019).
43. van Rheede, J. J. et al. Improving Mobility Performance in Low Vision With a Distance-Based Representation of the Visual SceneA Distance-Based Representation for Low Vision. Investig. Ophthalmol. & Vis. Sci. 56, 4802-4809, https://doi.org/10.1167/iovs.14-16311 https://iovs.arvojournals.org/arvo/content_public/journal/iovs/934219/i1552-5783-56-8-4802.pdf (2015).
44. Tuliper, A. Introduction to the hololens. https://msdn.microsoft.com/en-us/magazine/mt788624.aspx [Online; accessed 1 Jul. 2019] (2016).
45. Kipman, A. Microsoft mixed reality toolkit. https://github.com/Microsoft/MixedRealityToolkit-Unity [Online; last accessed 1 Jul. 2019](2018).
46. Menzel, R. Spectral sensitivity and color vision in invertebrates, 503-580 (Springer, 1979).
47. Koev, K., Georgiev, R. & Chernincova, S. Examination of colour vision deficiency in different types retinitis pigmentosa. Acta Ophthalmol. 91 (2013).
48. Haymes, S., Guest, D., Heyes, A. & Johnston, A. Comparison of functional mobility performance with clinical vision measures in simulated retinitis pigmentosa. Optom. vision science: official publication Am. Acad. Optom. 71, 442-453 (1994).
49. Held, R. & Shattuck, S. R. Color- and edge-sensitive channels in the human visual system: Tuning for orientation. Science 174, 314, https://doi.org/10.1126/science.174.4006.314 (1971).
50. Nishida, S., Watanabe, J., Kuriki, I. & Tokimoto, T. Human visual system integrates color signals along a motion trajectory. Curr. Biol. 17, 366-372, https://doi.org/10.1016/j.cub.2006.12.041 (2007).
51. Vassallo, R., Rankin, A., Chen, E. C. & Peters, T. M. Hologram stability evaluation for microsoft hololens. In Medical Imaging 2017: Image Perception, Observer Performance, and Technology Assessment, vol. 10136, 1013614 (International Society for Optics and Photonics, 2017).
52. Nau, A. C., Pintar, C., Fisher, C., Jeong, J. H. & Jeong, K. A standardized obstacle course for assessment of visual function in ultra low vision and artificial vision. J Vis Exp e51205, https://doi.org/10.3791/51205 (2014).
53. Stoll, C. et al. Navigating from a depth image converted into sound. Appl Bionics Biomech 2015, 543492, https://doi.org/10.1155/2015/543492 (2015).
54. Finger, R. P. et al. Developing a very low vision orientation and mobility test battery (o&m-vlv). Optom Vis Sci 93, 1127-36, https://doi.org/10.1097/opx.0000000000000891 (2016).
55. Pundlik, S., Tomasi, M. & Luo, G. Evaluation of a portable collision warning device for patients with peripheral vision loss in an obstacle course. Invest Ophthalmol Vis Sci 56, 2571-9, https://doi.org/10.1167/iovs.14-15935 (2015).
56. Patel, I. et al. Measures of visual function and percentage of preferred walking speed in older adults: the salisbury eye evaluation project. Invest Ophthalmol Vis Sci 47, 65-71, https://doi.org/10.1167/iovs.05-0582 (2006).
57. Linksz, A. The farnsworth panel d-15 test. Am. journal ophthalmology 62, 27-37(1966).
58. Haymes, S., Guest, D., Heyes, A. & Johnston, A. Mobility of people with retinitis pigmentosa as a function of vision and psychological variables. Optom. vision science: official publication Am. Acad. Optom. 73, 621-637 (1996).
59. Bibby, S. A., Maslin, E. R., McIlraith, R. & Soong, G. P. Vision and self-reported mobility performance in patients with low vision. Clin. Exp. Optom. 90, 115-123, https://doi.org/10.1111/j.1444-0938.2007.00120.x https://onlinelibrary.wiley.com/doi/pdf/10.1111/j.1444-0938.2007.00120.x (2007).
60. Wilcoxon, F. Individual comparisons by ranking methods. Biom. bulletin 1, 80-83 (1945).

What is claimed is:

1. An augmented reality system for providing depth perspective to a low-vision user, the augmented reality system comprising:
a sensor system that provides spatial data of objects in a surrounding environment of the low-vision user, wherein the sensor system includes at least one electromagnetic sensor, optical sensor, or video sensor;
a computer processor system that calculates spatial information of the objects from the spatial data received from the sensor system, the computer processor system determining a depth-to-color mapping in which distance of objects from the low-vision user is mapped to a predetermined viewable representation, wherein the depth-to-color mapping includes a colored wireframe with edge-enhancement; and
a head-mountable display that displays the depth-to-color mapping to a low-vision user, wherein distances of the objects from the low-vision user are rendered to allow at least partial viewability of the objects by the low-vision user and wherein the depth-to-color mapping assists in identifying objects by applying a pseudocolor map thereby facilitating navigation and grasp by the low-vision user, the pseudocolor map including discrete color changes to indicate varying distances of objects thereby ensuring partial viewability and object detection for the low-vision user, the computer processor system further being configured to construct a triangular point mesh using a geometric shader rather than continuously rendering a surface over the real world, wherein only an object's edges are represented with a wireframe and therefore do not obstruct text written on an object with a color overlay, and wherein the depth-to-color mapping is limited to objects within a maximum distance of 6 feet from the low-vision user to prevent sensory overload.

2. The augmented reality system of claim 1 where the depth-to-color mapping assists in identifying objects.

3. The augmented reality system of claim 1 wherein the sensor system and the head-mountable display are integrated into a single device.

4. The augmented reality system of claim 1 wherein the sensor system, the computer processor system and the head-mountable display are integrated into a single device.

5. The augmented reality system of claim 1 wherein the sensor system and the head-mountable display are integrated into a first device and the computer processor system being a separate device in communication with the first device.

6. The augmented reality system of claim 1 wherein the predetermined viewable representation further includes a component selected from the group consisting of a frequency map in which there are different frequencies for different distances, a brightness map in which there are different brightness for different distances, size map in which closer objects are bigger, and combinations thereof.

7. The augmented reality system of claim 1 wherein the predetermined viewable representation is a predetermined color.

8. The augmented reality system of claim 7 wherein the predetermined color is a pseudocolor or false-color with a plurality of discrete color changes based on distance from the low-vision user.

9. The augmented reality system of claim 8 wherein the plurality of discrete color changes includes from 3 to 10 color changes.

10. The augmented reality system of claim 1 wherein the sensor system includes a plurality of electromagnetic, optical, or video sensors.

11. The augmented reality system of claim 10 wherein spatial data from the plurality of electromagnetic, optical, or video sensors is analyzed by sensor fusion to provide the spatial information.

12. The augmented reality system of claim 1 wherein the sensor system includes a depth camera.

13. The augmented reality system of claim 12 wherein the sensor system includes at least one greyscale environment sensing camera that works with the depth camera to track the surrounding environment.

14. The augmented reality system of claim 1 wherein the sensor system includes a video camera and a light sensor.

15. The augmented reality system of claim 1 wherein the computer processor system includes a CPU and a GPU.

16. A method for providing depth perspective to a low-vision user, the method comprising:
receiving spatial data for objects in a surrounding environment of the low-vision user from at least one of an electromagnetic sensor, optical sensor, or video sensor;
calculating spatial information of the objects from spatial data, the spatial information including a depth-to-color mapping in which distance of objects from the low-vision user is mapped to a predetermined viewable representation, wherein the depth-to-color mapping includes a colored wireframe having a color encoded distance;
constructing a triangular point mesh using a geometric shader rather than continuously rendering a surface over the real world, wherein only an object's edges are represented with a wireframe and therefore do not obstruct text written on an object with a color overlay; and
displaying the depth-to-color mapping to the low-vision user on a head-mountable display wherein distances of the objects from the low-vision user are rendered to allow at least partial viewability of the objects by the low-vision user and wherein the depth-to-color mapping assists in identifying objects by applying a pseudocolor map thereby facilitating navigation and grasp by the low-vision user, the pseudocolor map including discrete color changes to indicate varying distances of objects thereby ensuring partial viewability and object detection for the low-vision user; and
limiting the depth-to-color mapping to objects within a maximum distance of 6 feet from the low-vision user to prevent sensory overload.

17. The method of claim 16 wherein the predetermined viewable representation is selected from the group consisting of pseudocolor map, a frequency map in which there are different frequencies for different distances, a brightness map in which there are different brightness for different distances, size map in which closer objects are bigger, and combinations thereof.

18. The method of claim 16 wherein the depth-to-color mapping assists in object identification.

19. The method of claim 16 wherein the predetermined viewable representation is a predetermined color.

20. The method of claim 19 wherein the predetermined color is a pseudocolor or false-color with a plurality of discrete color changes based on distance from the low-vision user.

21. The method of claim 20 wherein the plurality of discrete color changes includes from 3 to 10 changes.

22. The augmented reality system of claim 15 wherein the computer processor system further includes a custom chipset or an application-specific integrated chip.

* * * * *